United States Patent

Schmid et al.

[11] Patent Number: 5,977,653
[45] Date of Patent: Nov. 2, 1999

[54] CONFIGURATION FOR CONTROLLING A RESTRAINING DEVICE, IN PARTICULAR FOR A MOTOR VEHICLE

[75] Inventors: Gerhard Schmid, Regensburg; Walter Baumgartner, Zeitlarn; Michael Köppl, Sinzing; Stefan Hermann, Köfering, all of Germany

[73] Assignee: Siemens Aktiengesellschaft, Munich, Germany

[21] Appl. No.: 09/149,854

[22] Filed: Sep. 8, 1998

Related U.S. Application Data

[63] Continuation of application No. PCT/DE97/00353, Feb. 27, 1997.

[30] Foreign Application Priority Data

Mar. 8, 1996 [DE] Germany ............. 196 09 079

[51] Int. Cl.⁶ .................................................. B60R 21/32
[52] U.S. Cl. .................. 307/10.1; 180/282; 280/735
[58] Field of Search ................. 307/10.1–10.8, 307/9.1, 12.1; 180/274, 282; 280/728 R, 734, 739; 340/436; 701/36, 45, 46, 47

[56] References Cited

U.S. PATENT DOCUMENTS

| | | | |
|---|---|---|---|
| 4,359,715 | 11/1982 | Langer et al. . | |
| 5,107,245 | 4/1992 | Gesper et al. | 340/436 |
| 5,181,011 | 1/1993 | Okano | 340/438 |
| 5,182,459 | 1/1993 | Okano et al. | 307/10.1 |
| 5,261,506 | 11/1993 | Jost | 180/282 |
| 5,283,472 | 2/1994 | Takeuchi et al. | 307/10.1 |
| 5,309,436 | 5/1994 | Hirano et al. . | |
| 5,608,269 | 3/1997 | Fendt et al. | 307/9.1 |
| 5,657,831 | 8/1997 | Furui | 180/282 |
| 5,712,784 | 1/1998 | Fendt et al. | 701/45 |

FOREIGN PATENT DOCUMENTS

| | | |
|---|---|---|
| 0 283 737 A1 | 9/1988 | European Pat. Off. . |
| 0 471 871 A1 | 2/1992 | European Pat. Off. . |
| 0 507 581 A1 | 10/1992 | European Pat. Off. . |
| 0 531 989 A1 | 3/1993 | European Pat. Off. . |
| 32 22 570 A1 | 12/1982 | Germany . |
| 93 17 678 | 4/1995 | Germany . |

OTHER PUBLICATIONS

International Publication No. WO 88/05390 (Drobny et al.), dated Jul. 28, 1988.
International Publication No. WO 89/09146 (Nitschke et al.), dated Oct. 5, 1989.
International Publication No. WO 90/02672 (Schumacher et al.), dated Mar. 22, 1990.
"Airbag Current Source Select Interface and Inadvertant Deployment Safing Algorithm", Research Disclosure No. 381, Jan. 1996, Emsworth, GB.

*Primary Examiner*—Richard T. Elms
*Attorney, Agent, or Firm*—Herbert L. Lerner; Laurance A. Greenberg

[57] ABSTRACT

A configuration for controlling a restraining device has a first control unit which controls two electrically controllable power switches of a firing circuit connected to the restraining device as a function of acceleration. A third electrically controllable power switch is provided in the firing circuit and is controlled by a second control unit as a function of the acceleration.

16 Claims, 3 Drawing Sheets

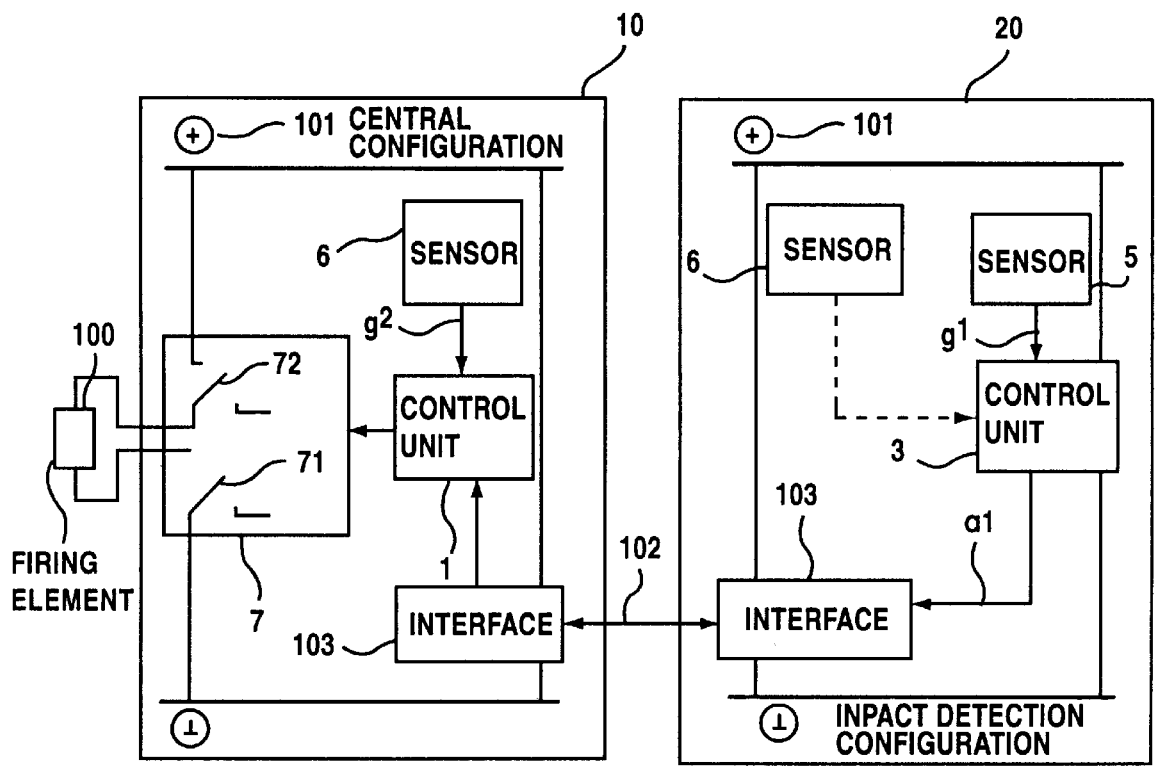

CONFIGURATION FOR CONTROLLING A RESTRAINING DEVICE, IN PARTICULAR FOR A MOTOR VEHICLE

Cross-Reference to Related Application

This is a continuation of International Application No. PCT/DE97/00353, filed on Feb. 27, 1997, which designated the United States.

BACKGROUND OF THE INVENTION

FIELD OF THE INVENTION

The invention relates to a configuration for controlling a restraining device such as an airbag, seat belt pretensioning device, etc., and in particularly for use in a motor vehicle. Such a configuration includes an acceleration sensor for sensing acceleration and outputting an acceleration signal. First and second control units are provided for receiving and processing the acceleration signal. A firing circuit having a firing element for controlling a restraining device is also provided. The firing circuit has a first, a second and a third power switch controlled by the first and second control units. An energy store energizes the firing element when all three power switches are actuated.

A microcomputer that processes the acceleration signals of two acceleration sensors is described in U.S. Pat. No. 5,182,495. If an impact is detected, two power switches in the firing circuit are switched through by the microcomputer, so that energy from an energy source is applied to the firing element disposed between the power switches. Each power transistor in the firing circuit is connected to, in each case, one output of the microcomputer. The power transistors are configured here in such a way that the one power transistor requires a logic one at the output of the microcomputer to be switched on, and the other power transistor requires a logic zero. If the microcomputer chip is severely damaged owing to a high level of heat or a mechanical effect, it is highly probable that either all of its outputs will supply a logic one or all of its outputs will supply a logic zero. The anti-phase actuation of the power switches that is necessary for firing prevents a misfire when the microcomputer is fundamentally degraded.

Misfiring still takes place if the functionality of the microcomputer is faulty, for example if the processing routines for the acceleration signals are faulty.

Published, Non-Prosecuted, German Patent Application DE 40 16 644 A1 discloses a configuration in which a microcomputer evaluates the signal of an acceleration sensor and, where necessary, switches through an electrically controllable power switch in the firing circuit. A further acceleration signal of a further acceleration sensor is assessed in a control unit of analog construction. The control unit that is of analog construction switches on a second electrically controllable power switch in the firing circuit if it detects a minimum acceleration of the vehicle. A firing element is disposed between the two power switches, and energy is applied to it if both power switches are switched on.

Such a configuration has the disadvantage that, in the event of a serious malfunction or severe damage to the microcomputer, the first power switch is incorrectly closed and, owing to the threshold which is low in the analog circuit an acceleration signal with a low amplitude, caused for example by the vehicle travelling over a curb, is already sufficient to fire the firing element.

A generic type of configuration utilizing a microcomputer which processes the signals of two acceleration sensors is disclosed in U.S. Pat. No. 5,283,472. Via two of its outputs, the microcomputer controls two electrically controllable power switches of a firing circuit. In addition, the firing circuit contains a mechanical acceleration switch that closes under the effect of a minimum acceleration.

A disadvantage of this configuration is that currently available mechanical acceleration switches have long closing times, and are thus not suitable for detecting a side impact of a motor vehicle.

SUMMARY OF THE INVENTION

It is accordingly an object of the invention to provide a configuration for controlling a restraining device, in particular for a motor vehicle which overcomes the hereinafore-mentioned disadvantages of the heretofore-known devices of this general type, in which extremely reliable protection against misfiring of a firing element is provided, and on the other hand, fires reliably and promptly when required.

With the foregoing and other objects in view there is provided, in accordance with the invention, a configuration for controlling a restraining device in a motor vehicle that includes an acceleration sensor for sensing acceleration and generating an acceleration signal. A first control unit receiving and processing the acceleration signal or a signal dependent on the acceleration signal is provided. An energy source and a firing circuit connected to the energy source are provided. The firing circuit includes a common carrier, three electrically controllable power switches and a firing element.

A first electrically controllable power switch is disposed on the common carrier. A firing element is associated with a restraining device and is disposed in series with the first electrically controllable power switch. A second electrically controllable power switch is disposed on the common carrier and in series with the firing element. The first control unit controls both the first electrically controllable power switch and the second electrically controllable power switch. A third electrically controllable power switch is disposed in series with the second electrically controllable power switch. The third electrically controllable power switch is not disposed on the common carrier.

A second control unit is provided that controls the third electrically controllable power switch in dependence on the acceleration. The energy source feeds energy to the firing element if the first, second and third electrically controllable power switches are switched on.

The object is achieved by disposing a third electrically controllable power switch which is controlled by the second control unit as a function of the acceleration in the firing configuration. Energy is fed from the energy source to the firing element only when all three controllable power switches in the firing circuit are appropriately switched on.

The invention advantageously prevents misfiring. If the first control unit has a defect and the power switches assigned to it are switched on, the firing element is effectively prevented from firing by the third power switch which is operated by the second control unit. In addition, the exclusive use of electrically controllable power switches in the firing circuit provides adequate current carrying capacity with small spatial dimensions. When mechanical acceleration switches are used in the firing circuit it may be possible, under certain circumstances, to achieve this current carrying capacity only by use of large dimensions. In addition, the power switches which can be operated by the first control unit prevent misfiring in the event of a defective third power switch or a defective second control unit. The configuration according to the invention provides, with the inclusion of an optimized level of expenditure on control elements and power components, an extremely reliable configuration, in particular in order to protect against side impacts, which largely avoids misfiring.

In an advantageous development, the first and second power switches are embodied on a common carrier, in particular as an integrated circuit with test logic. The third power switch is not disposed on the carrier.

To provide a low expenditure for manufacture, the power switches which can be controlled by the first control unit are preferably disposed on the common carrier. The expenditure for the routing of lines and the manufacturing expenditure incurred are kept low by virtue of, in particular, the fact that the two power switches are operated by a common control unit. The configuration of the third controllable power switch of the firing circuit on a separate carrier is extremely advantageous. In the event of a carrier defect, in particular faults in carriers which are embodied as integrated circuits, the power switches located on the carrier may be conductive and/or short-circuited, in such a fault, the third power switch must not also be adversely affected, with the result that incorrect switching on of all three power switches causes misfiring. If, on the other hand, the hardware of the third power switch is disposed physically separated from the other two power switches, the misfiring is prevented.

Advantageously, the second control unit and the third power switch are embodied together as an integrated circuit, with the result that the expenditure on manufacturing the configuration can be kept low.

In particular, it is advantageous to separate the hardware of the first and second control units from one another, with the result that a faulty circuit configuration of the first control unit does not adversely affect the operational capability of the second control unit, and vice versa. Thus, as an advantageous development, the control units also have circuit carriers that are physically separated from one another. Here, in particular, the first control unit is embodied as a microprocessor, and the second control unit as an analog or logic circuit.

In order to control the third power switch as a function of the acceleration, an acceleration signal is fed to the second control unit. One possibility is for the acceleration signal to be the acceleration signal of the acceleration sensor which also operates the first control unit with its signal. The overall expenditure of the configuration can thus be kept low if, for example, the operational capability of the acceleration sensor is periodically checked by test routines.

On the other hand, a further acceleration sensor may supply a further acceleration signal to the second control unit. In this way, the configuration has two firing paths which are completely independent of one another, having one acceleration sensor, one control unit and at least one power switch each, with the result that a misfiring is highly improbable.

In accordance with an added feature of the invention, there is an integrated circuit containing the first electrically controllable power switch and the second electrically controllable power switch.

In accordance with an additional feature of the invention, the second control unit receives and processes the acceleration signal or the signal dependent on the acceleration signal.

In accordance with another feature of the invention, there is provided a central configuration, an impact detection configuration, a third control device and a transmission line. The central configuration is disposed spatially separated from the impact detection configuration and they are connected to one another via the transmission line for transmitting coded data. The first control unit and the second control unit are part of the central configuration. The third control unit receives and processes the acceleration signal. The acceleration sensor and the third control unit are part of the impact detection configuration.

In accordance with a further added feature of the invention, there is provided a further acceleration sensor sensing acceleration and generating a further acceleration signal. The second control unit receives and processes the further acceleration signal or a signal dependent on the further acceleration signal. The further acceleration sensor is part of the central configuration.

In accordance with a further additional feature of the invention, there is provided a further acceleration sensor sensing acceleration and generating a further acceleration signal. The second control unit receives and processes the further acceleration signal or a signal dependent on the further acceleration signal. The further acceleration sensor is part of the impact detection configuration.

In accordance with another additional feature of the invention, the impact detection configuration outputs a signal received by the first control unit of the central configuration via the transmission line, and the first control device evaluates the signal.

In accordance with yet another feature of the invention, the impact detection configuration outputs a signal received by the first control unit and the second control unit of the central configuration via the transmission line. The first control unit and the second control unit evaluates the signal.

In accordance with yet another added feature of the invention, the impact detection configuration has a fourth control unit. The third control unit receives and processes the acceleration signal. The fourth control unit receives and processes the further acceleration signal. The third control unit and the fourth control unit have circuit configurations that are spatially separated from one another.

In accordance with yet another additional feature of the invention, the acceleration sensor senses a transversal acceleration of a vehicle.

In accordance with another added feature of the invention, the acceleration sensor senses a transversal acceleration of a vehicle. The impact detection configuration is disposed laterally in the vehicle, and the central configuration is disposed centrally in the vehicle.

In accordance with a concomitant feature of the invention, there is provided a high-impedance resistor. The first control unit is connected to the third electrically controllable power switch via the high-impedance resistor.

Other features which are considered as characteristic for the invention are set forth in the appended claims.

Although the invention is illustrated and described herein as embodied in a configuration for controlling a restraining device, in particular for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a block circuit diagram of a prior art circuit configuration.

DESCRIPTION OF THE PREFERRED EMBODIMENTS

Figure 1:
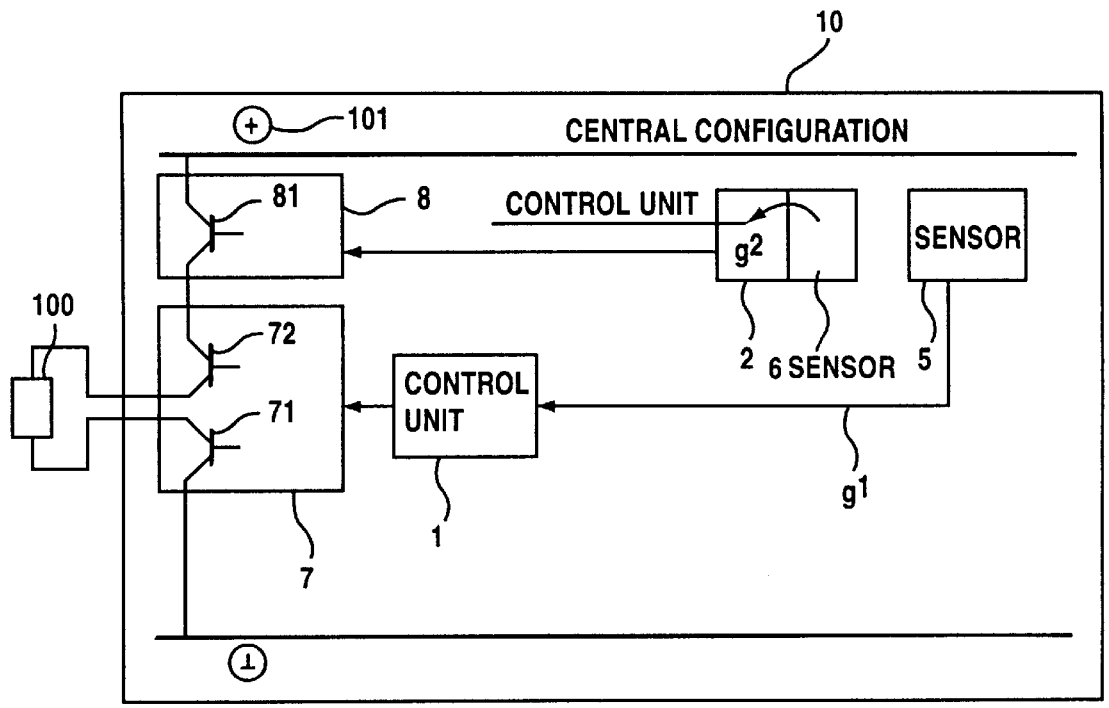
FIGS. 1 to 3 are block circuit diagrams of a circuit configuration according to the invention.

Referring now to the figures of the drawing in detail and first, particularly, to FIG. 6 thereof, there is shown a prior art circuit configuration described in U.S. Pat. No. 5,544,919 which has a central configuration arranged approximately on a vehicle drive shaft tunnel. The circuit configuration has a firing circuit that is connected to an energy source 101, a first control unit 1 in the form of a microprocessor, and an interface 103 for the transmission of data. A firing element 100, which is assigned to the firing circuit but is not disposed in a central configuration 10, is connected into the firing circuit via lines. The interface 103 of the central configuration 10 is connected, via a line 102 for transmission of data to the corresponding interface 103 of an impact detection configuration 20 which is disposed in a side part of a vehicle. The impact detection configuration 20 also has an acceleration sensor 5 and a further control unit 3.

The configuration serves to detect a side impact by use of the acceleration sensor 5 which senses transversal accelerations of the vehicle, and, in response, to fire, if appropriate, the restraining devices, assigned to the firing element 100, in order to protect against side impacts. The acceleration sensor 5 supplies an acceleration signal g1 to the further control unit 3 in which the acceleration signal g1 is compared with a plurality of threshold values. If the acceleration g1 exceeds one of the prescribed threshold values, a signal a1 is conveyed to the first control unit 1 via the transmission line 102 and the associated interfaces 103. The signal a1 which is usually put into a binary-coded form by the further control unit 3 is decoded in the first control unit 1. A further acceleration sensor 6, which is provided in the central configuration 10, supplies a further acceleration signal g2 to the first control unit 1. If the further acceleration g2 exceeds a threshold value assigned to it, and if the signal a1 is simultaneously available to the impact detection configuration 20, the firing circuit actuates the first control unit 1 in such a way that energy is applied to the firing element 100, and the associated restraining device is thus fired.

If the first control unit 1 has a defect, there is the risk that a control signal for firing the firing element will be output by the first control unit 1 without an impact occurring, resulting in a considerable hazard to the vehicle occupant, and moreover giving rise to unnecessary replacement costs for the used airbag. This configuration thus has few precautionary measures for avoiding a misfiring.

FIG. 1 shows a configuration according to the invention. Owing to its approximately central position in the vehicle, for example in the proximity of the vehicle drive shaft tunnel or the dashboard, there is provided the central configuration 10. Preferably, all the components of the central configuration 10 are disposed in a common housing and thus form a control unit. The configuration according to FIG. 1 is used, in particular, for firing the restraining devices for protection against head-on collisions or oblique-impact protection, but can also, if appropriate, be used in order to protect against side impacts. The central configuration 10 contains an energy supply 101, distinguished by a supply line with a positive supply voltage and a second supply line which is at ground potential or a negative potential. The acceleration signal g1 of the acceleration sensor 5 is supplied to the first control unit 1 which is supplied by the energy source 101. For protection against head-on collisions the acceleration signal g1 represents the acceleration of the vehicle in the direction of the longitudinal axis of the vehicle. The first control unit 1 is preferably embodied as a microprocessor and processes the analog acceleration signal g1, and integrates and compares it with a threshold value. If, owing to the processing of the acceleration signal g1, the first control unit 1 detects that there has been a sufficiently strong impact for the restraining devices to fire, a first power switch 71 and a second power switch 72 in a firing circuit of the central configuration 10 are switched through. The firing circuit of the configuration is connected to the energy supply 101 and has, in series with one another, firstly the first power switch 71, a firing element 100 assigned to the restraining device, and the second power switch 72. The firing element 100 is electrically connected here to the central configuration 10 via lines. In addition, there is provision of a further acceleration sensor 6 which supplies a further analog acceleration signal g2 to a second control unit 2. The further acceleration signal g2 is evaluated in the second control unit 2. If the second control unit 2 detects an impact, in which case the firing requirements and thus in particular a threshold value for the further acceleration signal g2 are set lower than in the case of the first acceleration signal g1, a third power switch 81 of the firing circuit is switched through by the second control unit 2. The third power switch 81 is disposed in series with the first two power switches 71 and 72, and with the firing element 100. Only if all the power switches (circuit breakers) 71, 72 and 81 are switched through by the corresponding control units 1 and 2, is sufficient energy fed to the firing element 100 by the energy source 101 to fire it.

The first and second electrically controllable power switches 71 and 72 are disposed on a common carrier 7, preferably as an integrated circuit on a silicon substrate. The third controllable power switch 81 is disposed on a further carrier 8, likewise preferably on a silicon substrate. The third power switch 81 can, however, also be discretely disposed as an output stage transistor.

Each one of the two power switches 71 and 72 is preferably operated by a separate output of the microprocessor or of the first control unit 1. Here, the power transistors 71 and 72 are embodied in terms of their physical construction such that they have to be actuated in anti-phase in order to switch through. Thus, for example the first power switch 71 becomes conductive as a result of a logic 1 at the associated output of the microprocessor (control unit) 1, but the second power switch 72 becomes conductive with a logic zero at the associated output of the microprocessor 1. This prevents the firing element 100 from being fired in the event of a defect at the microprocessor 1, because the outputs on a defective circuit carrier of the first control unit 1 are preferably operated with the same signals, that is to say either a one or a zero. The third power switch 81 ensures that a misfire is prevented if the evaluation algorithm of the first control unit 1 incorrectly converts a weak acceleration signal supplied by the acceleration sensor 5 into a firing instruction.

With the configuration according to the invention as shown in FIG. 1, a misfiring is initiated neither in the event of the faults specified above nor in the event of the faults specified below:

a defect in one of the acceleration sensors 5 or 6, a defect in one of the control units 1 or 2, a defect in one of the control units 1 or 2 relating to the evaluation of the supplied acceleration signals, and a defect in at most two of the three power switches 71, 72 and 81.

Instead of being connected to the further acceleration sensor 6, the second control unit 2 can also be connected to the acceleration sensor 5 and process its acceleration signal g1.

Figure 2:
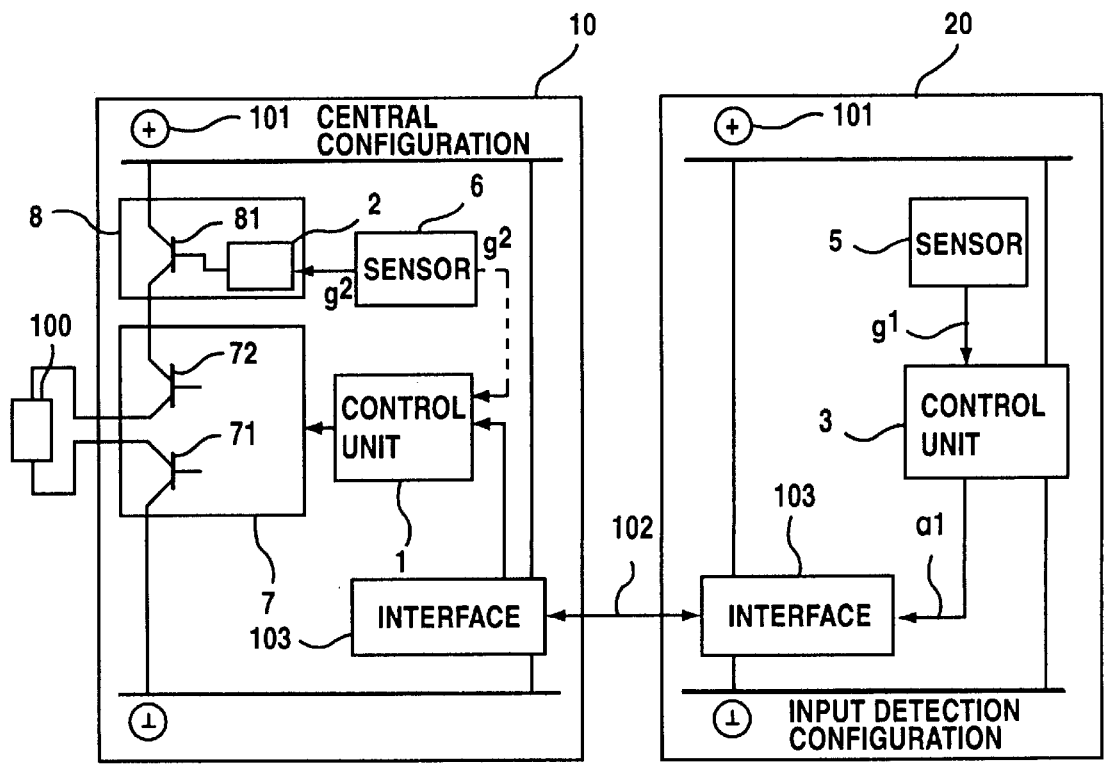

FIG. 2 shows a configuration which is preferably used for side-impact detection and for firing the appropriate restraining device(s). Here, the acceleration sensor 5 is dispose in a decentralized impact detection configuration 20, which is disposed, for example, in a side part of the vehicle. The further control unit 3, hereafter referred to as a third control unit 3, likewise associated with the impact detection configuration 20, evaluates the acceleration signal g1 and supplies evaluation results in the form of a signal a1 to the central configuration 10. The transmission of data between the impact detection configuration 20 and the central configuration 10 is carried out by the interface 103 and a line 102 for conveying coded data signals. Usually, the signal to be conveyed is coded in the third control unit 3, and in turn decoded in the first control unit 1 of the central configuration 10. A further assessment of the conveyed signal a1 may be carried out in the first control unit 1 of the central configuration 10. Alternatively, the acceleration signals g1 supplied by the acceleration sensor 5 may be merely analog-digital converted and coded in the third icontrol unit 3, so that complete assessment of the acceleration signals g1 takes place in the first control unit 1 of the central configuration 10.

The further acceleration sensor 6 is disposed in the central configuration 10. Its further acceleration signal g2 is evaluated in the second control unit 2, which in turn controls the third power switch 81. In contrast to the configuration according to FIG. 1, the second control unit 2 in FIG. 2 is disposed together with the third power switch 81 on the common carrier 8. The further acceleration switch 6 may also be disposed on the common carrier 8 using micromechanical technology, which further reduces the manufacturing costs. The firing element 100 is fired in accordance with the method described with respect to FIG. 1.

In order to increase reliability, the further acceleration signal g2, which is supplied by the second acceleration sensor 6, may, if appropriate, be additionally checked and/or processed in the first control unit 1.

Figure 3:
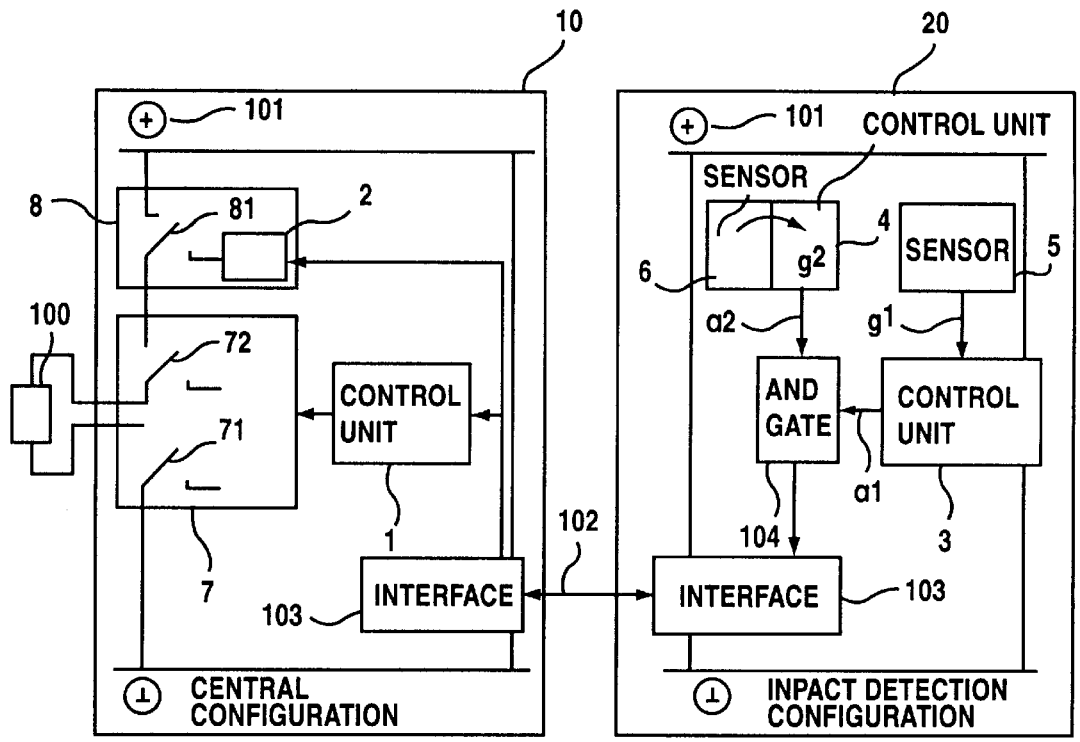

According to a further configuration in accordance with the invention as in FIG. 3, both the acceleration sensor 5 and the further acceleration sensor 6 are disposed in the impact detection configuration 20. Correspondingly, the impact detection configuration 20 has not only the third control unit 3 for the acceleration signal g1, but also a fourth control unit 4 for the further acceleration signal g2. The third and fourth control units 3 and 4 preferably being embodied as circuit configurations which are embodied separately from one another. Moreover, the third control unit 3 is preferably embodied as a microprocessor (according to the configuration in FIG. 2). The fourth control unit 4 is embodied as an analog or logic circuit, preferably in integrated form. The third control unit 3 and the fourth control unit 4 are connected to an AND gate 104 on a separate carrier. If a sufficiently strong impact is detected by the third control unit 3, it supplies a signal a1 to the AND gate 104, the signal a1 already being present in coded form which is intended to be transmitted between the interfaces 103. The fourth control unit 4 merely supplies an enable signal or a disable signal in the form of a one or zero to the AND gate 104 if the acceleration sensor 6 has detected a sufficiently strong acceleration. This has, in particular, the advantage that the probability of a defective third control unit 3 supplying a coded firing signal to the AND gate 104 is low. The probability of a defective control unit 3 supplying a permanent logic zero or a permanent logic one is greater, but this would then not be detected as a firing pattern by the first control unit 1 of the central configuration 10.

At the central configuration 10, the coded signal a1 is received by the interface 103 and conveyed to the first control unit 1, on the one hand, and to the second control unit 2, on the other. In both control units 1 and 2, the signal a1 is decoded and evaluated independently. When a firing instruction is detected by the two control units 1 and 2, the first control unit 1 switches through the two power switches 71 and 72, and the second control unit 2 switches through the third power switch 81, so that the firing element 100 is fired. The second control unit 2 is embodied, in particular, as a logic circuit, for example in the form of a further microprocessor, an ASIC or a logic gate. The separation of the firing paths, which was started at the acceleration sensors 5 and 6 and extends to the power switches 71, 72 and 81 with only the data transmission line 102 as a non-redundant component of the configuration, advantageously makes it possible to provide an configuration which has redundant elements which are used in a targeted fashion and which prevents, in particular, misfiring in the event of numerous individual faults in the overall configuration, and which has the advantages explained with reference to FIG. 1.

Irrespective of the other circuit configurations of the proposed configuration, when two acceleration sensors (redundancy) are used which are disposed spatially near to one another and advantageously on the same carrier, the acceleration sensors are to be disposed and/or connected in such a way that, for example in the event of a side impact "from the right", the one sensor supplies a transversal acceleration signal with a positive sign and, for the same impact, the other sensor supplies a signal with a negative sign. In the event of an impact "from the left", the sensors supply signals with inverted, but likewise opposed, signs.

Interference radiation acting, for example, on the sensor feed lines can, under certain circumstances, generate signals that are interpreted by the control circuit as sensor signals. The radiated interference signals are detected by virtue of the advantageous configuration or connection of the sensors and can be distinguished from sensor signals since the interference signals have the same sign. Preferably, the structurally identical sensors here are disposed rotated through 180° with respect to one another on the carriers. This configuration of the sensors with respect to one another is spatially independent of the spatial configuration of the sensors in the vehicle, that is to say irrespective of whether the sensors are disposed laterally or centrally on the vehicle.

Figure 4:
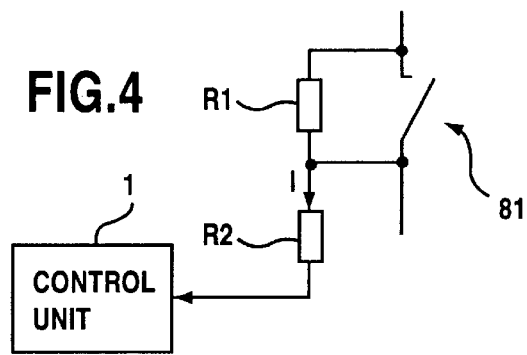
FIG. 4 is a block circuit diagram of a detail of the circuit configuration.

In a further advantageous development according to FIG. 4, the first control unit 1 is connected to a terminal of the third power switch 81 via a high-impedance resistor R2 with several kilo ohms. A low-impedance resistor R1 is connected parallel to the third power switch 81. The high-impedance connection between the first control unit 1 and third power switch 81 serves merely for checking whether the third power switch 81 is opened or closed. In this way, the first control unit 1 can carry out a plausibility check. If the first control unit 1 ascertains that the third power switch 81 is closed, but that, owing to its evaluation of the acceleration signal g1, there is no firing request present, it must conclude that the second control unit 2 is behaving incorrectly if it is being operated at a lower threshold than the first control unit 1. Thus, a visual or acoustic warning can be issued to the driver. If the first and second power switches 71 and 72 can be switched by the first control unit 1 for test purposes, i.e. can be opened and closed, this control effect of the control unit 1 must be ruled out at the third power switch. As a result of leakage currents originating from the control unit 1, the power switches 71 and 72 can be closed via low-impedance control lines leading to the power switches. Such a leakage-current effect can be ruled out at the third power switch 81 by the first control unit 1, since there would be the risk of all three power switches closing as a result of the leakage current. For this reason, the measurement connection between the first control unit 1 and the third power switch 81 is at high impedance. In order to check continuously the operational capability of the power switches 71 and 72, it is, however, necessary to switch them on for testing purposes, thus requiring a low-impedance connection between the first control unit and the power switches 71 and 72. Likewise, the second control unit 2 can, for testing purposes, advantageously open or close the third power switch 81 assigned to it.

Figure 5:
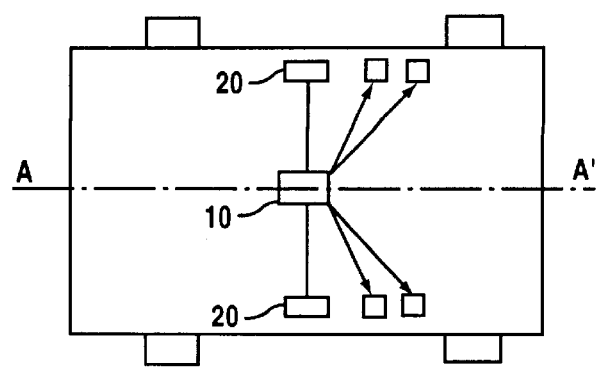
FIG. 5 is a block circuit diagram of the circuit configuration in a vehicle.

FIG. 5 shows the spatial positioning of the configuration according to the invention in accordance with FIGS. 2 or 3. The central configuration 10 is located approximately in the center of the vehicle, two impact detection configurations 20 are disposed on each side of the vehicle with respect to the longitudinal axis A—A' of the vehicle, and are connected to the central configuration 10 via lines. Ignition lines lead from the central configuration 10 to the restraining devices which are also disposed laterally on the vehicle.

We claim:

1. A configuration for controlling a restraining device, comprising:
   an acceleration sensor for sensing acceleration and generating an acceleration signal;
   a first control unit receiving and processing said acceleration signal or a signal dependent on said acceleration signal;
   an energy source;
   a firing circuit connected to said energy source, said firing circuit including:
     a common carrier;
     a first electrically controllable power switch disposed on said common carrier;
     a firing element associated with a restraining device and disposed in series with said first electrically controllable power switch;
     a second electrically controllable power switch disposed on said common carrier and in series with said firing element, said first control unit controlling both said first electrically controllable power switch and said second electrically controllable power switch; and
     a third electrically controllable power switch disposed apart from said common carrier and connected in series with said second electrically controllable power switch;
   a second control unit controlling said third electrically controllable power switch in dependence on the acceleration; and
   said energy source energizing said firing element if said first, second and third electrically controllable power switches are switched on.

2. The configuration according to claim 1, including an integrated circuit containing said first electrically controllable power switch and said second electrically controllable power switch.

3. The configuration according to claim 1, wherein said second control unit is embodied as a circuit configuration separated from said first control unit.

4. The configuration according to claim 3, including a further integrated circuit containing said second control unit and said third electrically controllable power switch.

5. The configuration according to claim 1, wherein said second control unit receives and processes said acceleration signal or said signal dependent on said acceleration signal.

6. The configuration according to claim 1, including a further acceleration sensor sensing acceleration and generating a further acceleration signal, said second control unit receiving and processing said further acceleration signal or a signal dependent on said further acceleration signal.

7. The configuration according to claim 1, including a central configuration, an impact detection configuration, a third control device and a transmission line, said central configuration disposed spatially separated from said impact detection configuration and connected to one another via said transmission line for transmitting coded data, said first control unit and said second control unit are part of said central configuration, said third control unit receiving and processing said acceleration signal, and said acceleration sensor and said third control unit are part of said impact detection configuration.

8. The configuration according to claim 7, including a further acceleration sensor sensing acceleration and generating a further acceleration signal, said second control unit receiving and processing said further acceleration signal or a signal dependent on said further acceleration signal, and said further acceleration sensor is part of said central configuration.

9. The configuration according to claim 7, including a further acceleration sensor sensing acceleration and generating a further acceleration signal, said second control unit receiving and processing said further acceleration signal or a signal dependent on said further acceleration signal, and said further acceleration sensor is part of said impact detection configuration.

10. The configuration according to claim 8, wherein said impact detection configuration outputs a signal received by said first control unit of said central configuration via said transmission line, and said first control unit evaluating said signal.

11. The configuration according to claim 9, wherein said impact detection configuration outputs a signal received by said first control unit and said second control unit of said central configuration via said transmission line, and said first control unit and said second control unit evaluating said signal.

12. The configuration according to claim 9, wherein said impact detection configuration has a fourth control unit, said third control unit receiving and processing said acceleration signal, said fourth control unit receiving and processing said further acceleration signal, and said third control unit and said fourth control unit having circuit configurations spatially separated from one another.

13. The configuration according to claim 1, wherein said acceleration sensor senses a transversal acceleration of a vehicle.

14. The configuration according to claim 7, wherein said acceleration sensor senses a transversal acceleration of a vehicle, said impact detection configuration is disposed laterally in the vehicle, and said central configuration is disposed centrally in the vehicle.

15. The configuration according to claim 1, including a high-impedance resistor, and said first control unit is connected to said third electrically controllable power switch via said high-impedance resistor.

16. A configuration for controlling a restraining device in a motor vehicle, comprising:

an acceleration sensor for sensing acceleration and generating an acceleration signal;

a first control unit receiving and processing said acceleration signal or a signal dependent on said acceleration signal;

an energy source;

a firing circuit connected to said energy source, said firing circuit including:
- a common carrier;
- a first electrically controllable power switch disposed on said common carrier;
- a firing element associated with a restraining device and disposed in series with said first electrically controllable power switch;
- a second electrically controllable power switch disposed on said common carrier and in series with said firing element, said first control unit controlling both said first electrically controllable power switch and said second electrically controllable power switch; and
- a third electrically controllable power switch disposed apart from said common carrier and connected in series with said second electrically controllable power switch;

a second control unit controlling said third electrically controllable power switch in dependence on the acceleration; and said energy source energizing said firing element if said first, second and third electrically controllable power switches are switched on.

* * * * *